(12) United States Patent
Sanghvi et al.

(10) Patent No.: US 10,873,637 B2
(45) Date of Patent: Dec. 22, 2020

(54) CONTROLLING SERVICE DISCOVERY AND ACTIVATION AMONG PEERS

(71) Applicant: MICROSOFT TECHNOLOGY LICENSING, LLC, Redmond, WA (US)

(72) Inventors: Niket Ashok Sanghvi, Seattle, WA (US); Benjamin Scott McGregor, Redmond, WA (US); Kushal Suresh Narkhede, Redmond, WA (US); Alain Michaud, Quebec (CA); Andrew Gordon Cunningham, Redmond, WA (US); Samuel David Adams, Bellevue, WA (US); James George Cavalaris, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 97 days.

(21) Appl. No.: 15/144,349

(22) Filed: May 2, 2016

(65) Prior Publication Data
US 2017/0318098 A1 Nov. 2, 2017

(51) Int. Cl.
*H04L 29/08* (2006.01)
*H04L 29/06* (2006.01)
(Continued)

(52) U.S. Cl.
CPC .............. *H04L 67/16* (2013.01); *H04L 45/02* (2013.01); *H04L 67/104* (2013.01); *H04L 69/03* (2013.01);
(Continued)

(58) Field of Classification Search
CPC ....... H04L 67/16; H04L 69/03; H04L 67/104; H04L 61/1541; H04L 45/02;
(Continued)

(56) References Cited

U.S. PATENT DOCUMENTS 7,613,426 B2 12/2009 Kuehnel et al.
8,285,860 B2 10/2012 McGuire et al.
(Continued)

FOREIGN PATENT DOCUMENTS

CN 104079544 A 10/2014
WO 2007005131 A2 1/2007

OTHER PUBLICATIONS

Berg Insight, "Executive Summary;" Jun. 10, 2012, https://web.archive.org/web/20120610042820/http://www.berginsight.com/ReportPDF/Summary/bi-hct3-sum.pdf.*
(Continued)

*Primary Examiner* — John A Follansbee
*Assistant Examiner* — Lam T Do
(74) *Attorney, Agent, or Firm* — Holzer Patel Drennan

(57) ABSTRACT

Systems, methods, and computer-readable storage media are provided for publishing, discovering, connecting with and activating services in a peer-to-peer environment. Services available in association with a first computing device are determined and encoded with instructions for accessing and understanding such services via their respective activation protocols. The encoded services are published via a publication protocol such that they are discoverable by at least a second computing device, irrespective of whether such services may be activated via the publication protocol. The second computing device discovers the available services via the publication protocol and accesses and understands the instructions associated with a desired service. Upon receipt of a request from the second computing device, via the activation protocol, to activate the requested service, the requested service is activated by the first computing device.

20 Claims, 5 Drawing Sheets

(51) Int. Cl.
| | |
|---|---|
| H04L 12/751 | (2013.01) |
| H04W 52/02 | (2009.01) |
| H04W 84/18 | (2009.01) |
| H04W 48/16 | (2009.01) |
| H04W 76/14 | (2018.01) |
| H04W 8/00 | (2009.01) |
| H04L 29/12 | (2006.01) |

(52) U.S. Cl.
CPC .......... H04W 8/005 (2013.01); H04W 48/16 (2013.01); H04W 52/02 (2013.01); H04W 76/14 (2018.02); H04W 84/18 (2013.01); H04L 61/1511 (2013.01); H04L 61/1541 (2013.01); Y02D 30/70 (2020.08)

(58) Field of Classification Search
CPC ... H04L 61/1511; H04W 8/005; H04W 84/18; H04W 76/023; H04W 48/16; H04W 76/14; H04W 52/02; Y02D 70/00
See application file for complete search history.

(56) References Cited

U.S. PATENT DOCUMENTS

| | | | |
|---|---|---|---|
| 8,616,976 B2 | 12/2013 | Kaarela et al. | |
| 8,819,219 B2 | 8/2014 | Vandwalle et al. | |
| 9,591,582 B1* | 3/2017 | Rabii | H04W 52/028 |
| 2005/0018687 A1 | 1/2005 | Cutler | |
| 2005/0026593 A1* | 2/2005 | Anderson | G06F 3/1222 |
| | | | 455/410 |
| 2005/0128958 A1 | 6/2005 | Hamdan | |
| 2008/0086370 A1* | 4/2008 | Narayanaswami ... | G06F 3/1415 |
| | | | 705/14.73 |
| 2008/0171561 A1* | 7/2008 | Irony | H04W 76/025 |
| | | | 455/466 |
| 2010/0115279 A1* | 5/2010 | Frikart | G06F 19/3418 |
| | | | 713/171 |
| 2010/0274874 A1 | 10/2010 | Reunamaki | |
| 2013/0029712 A1 | 1/2013 | Shao et al. | |
| 2013/0065584 A1 | 3/2013 | Lyon et al. | |
| 2014/0045422 A1* | 2/2014 | Qi | H04W 76/023 |
| | | | 455/39 |
| 2014/0214958 A1 | 7/2014 | Cheshire | |
| 2014/0376405 A1* | 12/2014 | Erickson | H04W 52/0212 |
| | | | 370/254 |
| 2015/0319029 A1 | 11/2015 | Abraham et al. | |
| 2015/0350813 A1* | 12/2015 | Prats | H04W 88/06 |
| | | | 709/208 |
| 2016/0112262 A1* | 4/2016 | Johnson | G06F 9/45504 |
| | | | 709/221 |
| 2017/0078408 A1* | 3/2017 | Lepp | H04L 67/16 |
| 2017/0181627 A1* | 6/2017 | Baker | A61B 5/002 |
| 2017/0223579 A1* | 8/2017 | Lee | H04W 28/16 |
| 2017/0223601 A1* | 8/2017 | Egner | H04W 4/14 |
| 2017/0339126 A1* | 11/2017 | Maguire | H04L 63/08 |

OTHER PUBLICATIONS

Haamdi, Mohamed, "Windows Phone 8: Peer Connection (Bluetooth and Wi-Fi Direct);" Aug. 22, 2012, https://dzone.com/articles/windows-phone-8-peer (Year: 2012).*

"International Search Report and Written Opinion Issued in PCT Application No. PCT/US2017/029991", dated Jul. 6, 2017, 13 Pages.

Desai, et al., "Konark—A Service Discovery and Delivery Protocol for Ad-Hoc Networks", In Proceedings of IEEE Wireless Communications and Networking, Mar. 16, 2003, 16 pages.

Djamaa, et al., "An Efficient Service Discovery Protocol for 6LoWPANs", In Conference of Science and Information, Oct. 7, 2013, 8 pages.

"Using Bluetooth Low Energy", Retrieved on: Apr. 27, 2015, Available at: http://docwiki.embarcadero.com/RADStudio/XE8/en/Using_Bluetooth_Low_Energy.

Karlsson, et al., "Device and Service Discovery in Bluetooth Networks", In Master Thesis, Jun. 4, 2002, 79 pages.

Krumm, et al., "The NearMe Wireless Proximity Server", In Proceedings of the Sixth International Conference on Ubiquitous Computing , Sep. 7, 2004, 18 pages.

"Windows.Networking.Proximity Namespace", Retrieved on: May 1, 2015 Available at: http://msdn.microsoft.com/en-us/library/windows/apps/windows.networking.proximity.aspx.

"Using Windows Rally Vertical Pairing to Automatically Install Wi-Fi Devices", Retrieved on: May 1, 2015 Available at: http://msdn.microsoft.com/en-us/library/windows/hardware/dn614006(v=vs.85).aspx.

* cited by examiner

CONTROLLING SERVICE DISCOVERY AND ACTIVATION AMONG PEERS

BACKGROUND

It is often desirable for a computing device to discover and utilize services associated with other computing devices. For instance, persons conducting a meeting and utilizing their respective computing devices may be able to make use of a Surface Hub (available from Microsoft Corporation of Redmond, Wash.) in the room for a number of services, e.g., projecting, file sharing, wireless virtual smart card authentication, and the like. However, discovering, connecting with and activating the services of the Surface Hub often are elusive tasks in such situations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for publishing, discovering, connecting with and/or activating services in a peer-to-peer environment. Services available in association with a first computing device are determined and encoded with instructions for accessing and understanding such services via their respective activation protocols. The encoded services are published via a publication protocol such that they are discoverable by at least a second computing device, irrespective of whether such services may be activated via the publication protocol. The second computing device discovers the available services via the publication protocol and accesses and understands the instructions associated with a desired service. Upon receipt of a request from the second computing device, via the activation protocol, to activate the requested service, the requested service is activated by the first computing device.

Embodiments of the present invention provide for layering protocols, e.g., industry standard protocols, such that the strengths of the best (e.g., most efficient or optimal) protocol for the particular stage of the scenario (e.g., publication, discovery, connection, and activation) are leveraged and protocols that have weaknesses in a given scenario stage are avoided. By way of example and not limitation, service publication and discovery may be provided over the most power-efficient protocol available and service connection and activation may be provided over the most performant protocol available. Additionally, services available via one protocol may be discoverable via another protocol.

BRIEF DESCRIPTION OF THE DRAWINGS

The present technology is illustrated by way of example and not limitation in the accompanying figures in which like reference numerals indicate similar elements and in which.

DETAILED DESCRIPTION

Figure 1:
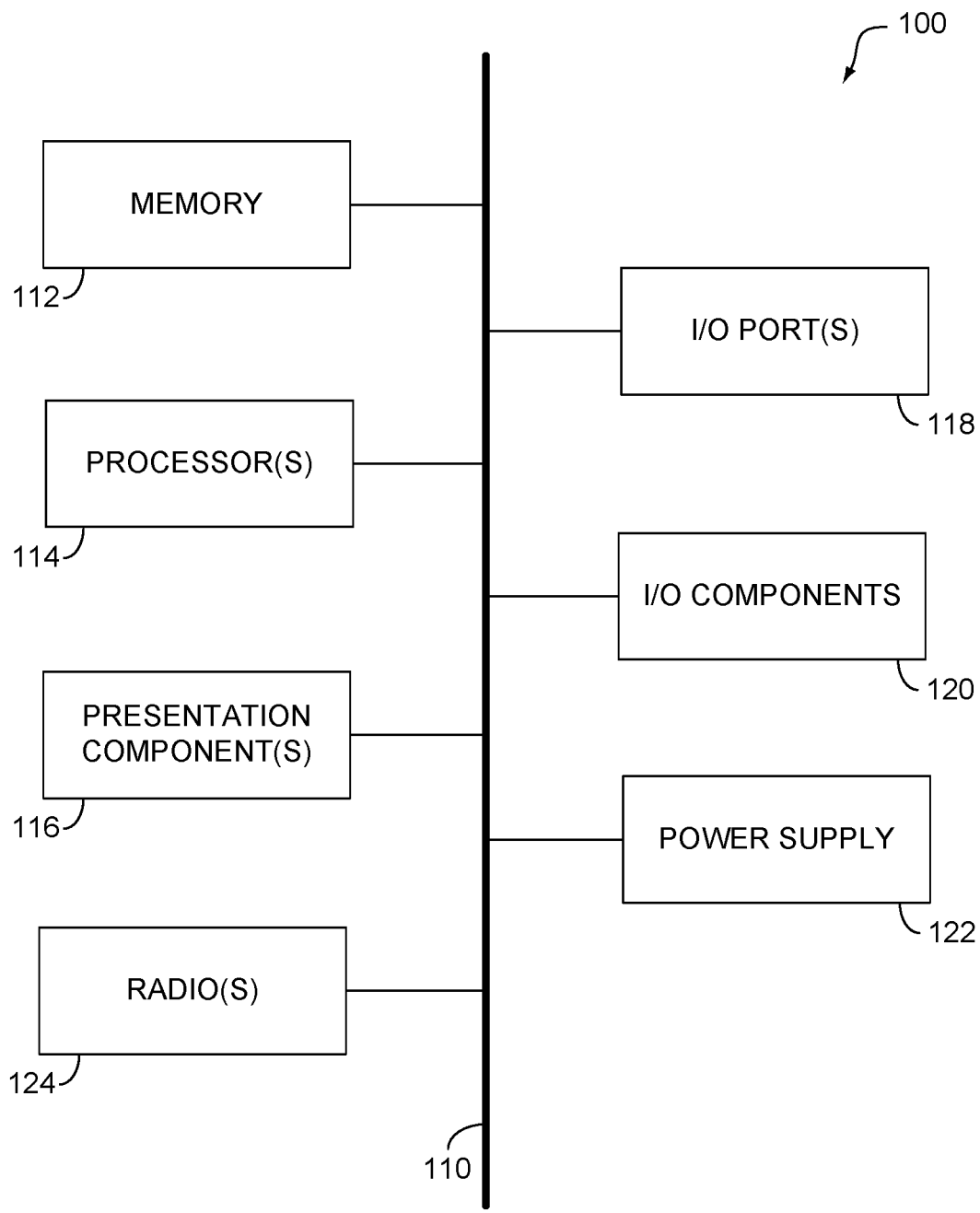
FIG. 1 is a block diagram of an exemplary computing environment suitable for use in implementing embodiments of the present technology.

The subject matter of the present technology is described with specificity herein to meet statutory requirements. However, the description itself is not intended to limit the scope of this patent application. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Discovering, connecting with and activating available services of proximal computing devices are elusive tasks. Attempts to address the elusiveness include protocol-specific approaches, vertical pairing and an approach provided with WINDOWS 8 offered by Microsoft Corporation of Redmond, Wash. Protocol-specific approaches may be broadly categorized into two classes of protocols. The first category is higher-level Internet Protocol (IP)-network based protocols that require both peers to already be on a shared Local Area Network (LAN). Examples of this category of protocol-specific approaches include Universal Plug'n'Play (UPnP)+Digital Living Network Alliance (DLNA), Multicast Domain Name System (mDNS)/Domain Name System-Service Discovery (DNS-SD), Web Services for Devices (WSD), and AllJoyn. The other category includes Personal Area Network (PAN)-like protocols such as Bluetooth/BluetoothLE (BTLE), ZigBee (802.11.4), or WiFiDirect (WFD) that can actually bootstrap their own network to enable peer-to-peer connections.

All of these protocols have their strengths and weaknesses. Shared network-based protocol schemes fail when a peer cannot be reached over any preexisting network. Additionally, most wired protocols cannot discover peers unless they are on the same subnet. Bluetooth and BTLE perform well at power-efficient proximal peer discovery; however, they are very bandwidth limited. WiFiDirect can perform proximal peer-to-peer discovery like Bluetooth and BTLE, is high bandwidth, and supports IP-based services; however, it is far less power-efficient than Bluetooth and BTLE.

A few protocols include a concept referred to as "vertical pairing" that is best described by virtue of example, in this case, a WFD printer. When a user pairs the printer over WFD, the WFD stack takes a second step to associate the printing service on a higher layer protocol (e.g., WSD or Internet Printing Protocol (IPP)) with the computing device. In order to use a higher-layer protocol's service (e.g., WSD printing), a lower-layer protocol (WFD) is paired first. The lower-layer protocol stack has knowledge of the higher-layer stack. It is encoded into the lower-layer protocol's discovery mechanism. The vertical pairing is implemented by the operating system's protocol stack. Service discovery and activation in accordance with embodiments hereof does not require such implementation and is more versatile than vertical pairing approaches.

WINDOWS 8, available from Microsoft Corporation of Redmond, Wash., includes an Application Programming Interface (API) known as "PeerFinder." PeerFinder permits an application on two peers to proximally discover each other through either WFD or Bluetooth, and then creates a socket-like connection between the peers whereby the application can implement its own protocol. However, this high-level API precludes interoperability.

Various aspects of the technology described herein are generally directed to systems, methods, and computer-readable storage media for layering protocols, e.g., industry standard protocols, such that the strengths of the best (e.g., most efficient or optimal) protocol for the particular stage of the scenario (e.g., publication, discovery, connection, and activation) are leveraged and protocols that have weaknesses in a given scenario stage are avoided. By way of example and not limitation, service publication and discovery may be provided over the most power-efficient protocol available and service connection and activation may be provided over the most performant protocol available. Additionally, services available via one protocol may be discoverable via another protocol.

Having briefly described an overview of embodiments of the present technology, an exemplary operating environment in which embodiments of the present technology may be implemented is described below in order to provide a general context for various aspects of the present technology. Referring to the figures in general and initially to FIG. 1 in particular, an exemplary operating environment for implementing embodiments of the present technology is shown and designated generally as computing device 100. The computing device 100 is but one example of a suitable computing environment and is not intended to suggest any limitation as to the scope of use or functionality of embodiments of the technology. Neither should the computing device 100 be interpreted as having any dependency or requirement relating to any one component nor any combination of components illustrated.

Exemplary Operating Environment

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use of the technology described herein. Neither should the computing device 100 be interpreted as having any dependency or requirement relating to any one or combination of components illustrated.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or a combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes volatile and nonvolatile, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices, including I/O components 120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

As previously set forth, embodiments of the present technology provide systems, methods, and computer-readable storage media for publishing service availability, discovering available services, connecting with available services and/or activating available services. Embodiments of the technology take a hybrid standards-based approach that layers protocols, e.g., industry standard protocols, such that strengths of the "best" (e.g., most efficient or optimal) protocol for the particular stage of the service discovery scenario (e.g., publication, discovery, connection, or activation) are leveraged and protocols having weaknesses for the particular stage of the service discovery scenario are avoided. Embodiments hereof also provide a mechanism for discovering services from one protocol on another.

The term "services" is used broadly herein and may include any capability or resource associated with a first peer computing device that may be accessed or utilized by a second peer computing device, as described herein. For example and without limitation, services may include a microphone, camera, speaker, printer, media server, a display component (such as a projector, monitor, or virtual reality headset), a user interface (such as a touch screen or touch pad, mouse, keyboard, Smart Board, Internet or network connection or network connection component (such as a BLTE smart card), computer-processing or computation capabilities (which may be used for providing faster rendering or more efficient computation than what is possible on the second peer computing device), storage, I/O ports, specific applications (or apps) and computer-performed services (which may include a virtual assistant program or a cloud-based service, for instance), or specific equipment (such as a HoloLens or Smart Hub, both manufactured by Microsoft of Redmond, Wash., a smart appliance, or smart-home controller). A particular service may have corresponding information about accessing and understanding that service, which may be utilized in order to make the service available to another computing device.

By way of example and not limitation, for a given configuration, the "best" protocol for discovery and publication may be a protocol having superior power efficiency relative to other available protocols given the details of a given service discovery scenario. (Various service discovery scenarios and exemplary details associated therewith are discussed more fully below.) For instance, BTLE may be selected as the best protocol for proximal peer-to-peer service discovery and, for infrastructure IP-based networks, DNS-SD may be selected. In embodiments, more than one protocol may be selected and published as the "best" protocol for a given stage of a service discovery scenario as various discovering devices may support different technologies. Any and all such variations, and any combination thereof, are contemplated to be within the scope of embodiments of the present technology.

After the peer computing devices discover one another's services, embodiments hereof provide a path for the peers to switch their connection to another transport or protocol as appropriate. By way of example and not limitation, the "best" protocol for connection and activation may be a protocol having superior performance relative to other available protocols given the details of a given service discovery scenario. For instance, persons conducting a meeting and utilizing their respective computing devices may be able to make use of a Surface Hub (available from Microsoft Corporation of Redmond, Wash.) in the room that is published and discoverable over the power-efficient BTLE protocol, but connection and activation may be desired over a shared IP-network. Alternatively, WFD may be used to bootstrap a shared IP-network in such scenarios. Again, in embodiments, more than one protocol may be selected and published as the "best" protocol for a given stage of a service discovery scenario as various devices may support different technologies.

In this way, embodiments of the present technology can be, for example, simultaneously power-efficient and performant in various service discovery scenarios as the strengths of the best protocol for the particular stage of the service discovery scenario may be leveraged and protocols may be switched as the stage of the service discovery scenario changes. Additionally, in embodiments, standards-based protocols may be leveraged that can be implemented on any platform. For instance, a developer may discover, read, or even publish a MICROSOFT vendor defined BTLE service advertisement on iOS®, ANDROID, or even a BTLE microcontroller that permits all to interoperate.

The general concepts discussed herein may be applied to other or different protocols. Many combinations are valid; for instance, UPnP may be used as the publication and discovery mechanism for services on Bluetooth, WFD, or WSD. Even though all combinations are possible and are intended within the scope hereof, as a practical matter, some combinations are more effective than others. In exemplary embodiments, the choice of protocols may be primarily concerned with enabling peer-to-peer service discovery, publication and activation that is foremost power-efficient and interoperable with other platforms.

Figure 2:
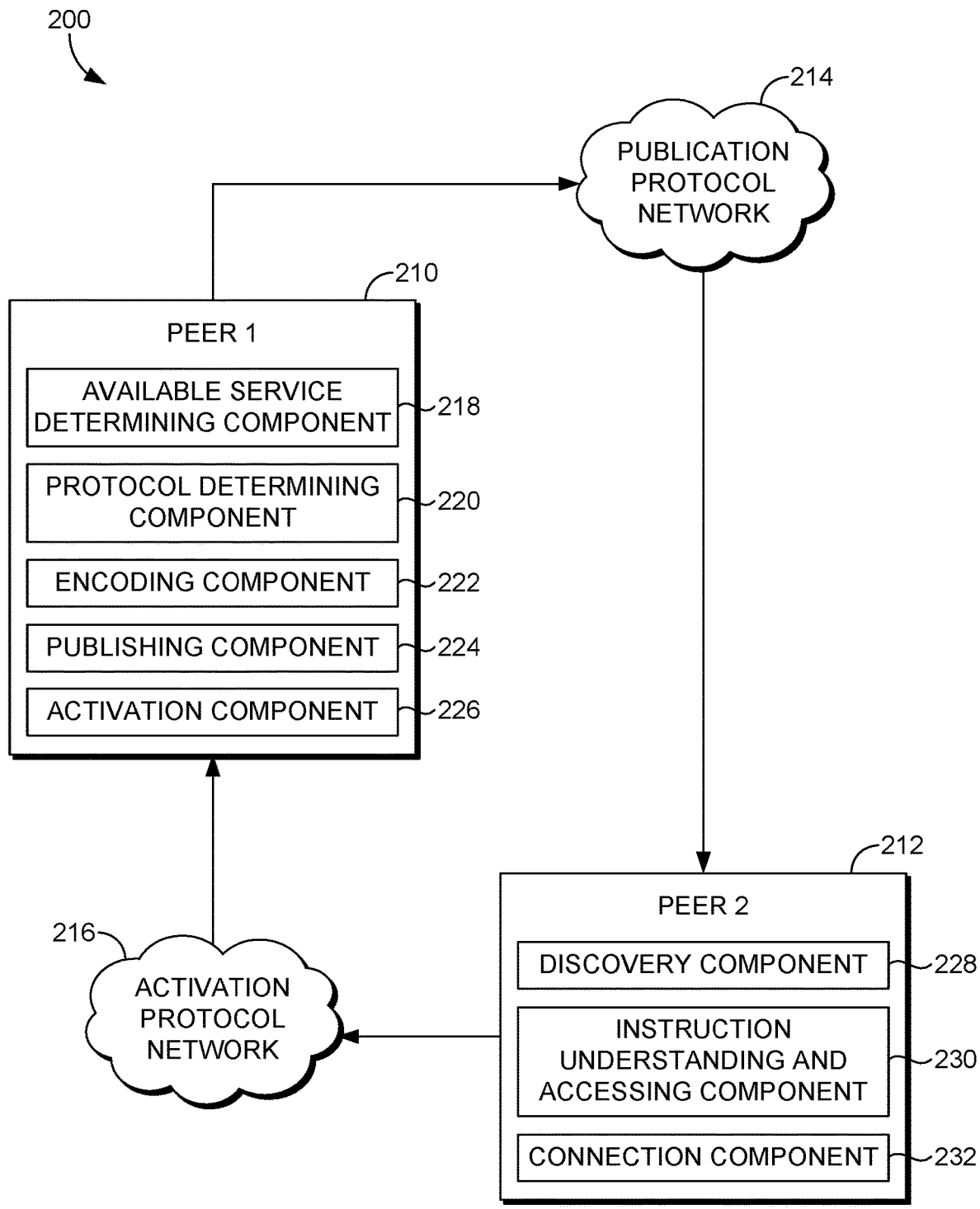
FIG. 2 is a block diagram of an exemplary computing system in which embodiments of the technology may be employed.

With reference now to FIG. 2, a block diagram is provided illustrating an exemplary computing system 200 in which embodiments of the present invention may be employed. Generally, the computing system 200 illustrates an environment in which available services associated with proximal computing devices may be published, discovered, connected with and activated in accordance with the methods, for instance, illustrated in FIGS. 3, 4 and 5 (more fully described below). Among other components not shown, the computing system 200 generally includes a first peer computing device 210 and a second peer computing device 212, in communication with one another via a publication protocol network 214 and an activation protocol network 216. Each of the publication protocol network 214 and the activation protocol network 216 may include, without limitation, one or more LANs, wide area networks (WANs), UPnP networks, DLNA networks, mDNS networks, DNS-SD networks, WSD networks, Bluetooth networks, BTLE networks, ZigBee (802.11.4) networks, or WFD networks. Such networking environments are commonplace in offices, enterprise-wide computer networks, intranets and the Internet. Additionally, the arrows shown in FIG. 2 to and from publication protocol network 214 and an activation protocol network 216 are merely illustrative of the information that flows from one peer computing device to another, and not intending to convey a direction of communication, which occurs both ways, in the above listed example protocols.

It should be understood that any number of peer computing devices 210, 212 may be employed in the computing system 200 within the scope of embodiments of the present technology. Each may comprise a single device/interface or multiple devices/interfaces cooperating in a distributed environment. For instance, one or both of the first peer computing device 210 and the second peer computing device 212 may comprise multiple devices and/or modules arranged in a distributed environment that collectively provide the functionality of the first peer computing device 210 and the second peer computing device 212 as described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the first peer computing device 210, the second peer computing device 212, or as an Internet-based or network-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of peer computing devices. By way of example only, one or both of the first peer computing device 210 and the second peer computing device 212 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the first peer computing device 210 and the second peer computing device 212 may include any type of computing device, such as the computing device 100 described with reference to FIG. 1, for example. Each of the first peer computing device 210 and the second peer computing device 212 generally is configured to publish to or discover from proximal computing devices, available services. Each of the first peer computing device 210 and the second peer computing device 212 further generally is configured to initiate connection with proximal computing device services and activate services associated with it. Generally, each of the first peer computing device 210 and the second peer computing device 212 may be a desktop computing device having an external inputting component (such as an external keyboard, keypad, or the like), a mobile computing device having an inputting component that is separate and distinct from any display screen, or a mobile or desktop computing device having an inputting component integrated with the display screen thereof (e.g., a touch-screen keyboard/keypad, or the like). The first peer computing device 210 and second peer computing device 212 in accordance with embodiments hereof may include any combination of external and integrated inputting devices. In some embodiments, peer computing devices suitable for use with embodiments of the present technology may include a microphone or other listening device for accepting voice input. Any and all such variations, and any combination thereof, are contemplated to be within the scope of embodiments of the present technology. It should be noted that the embodiments of the present technology are equally applicable to mobile computing devices and devices accepting gesture, touch and/or voice input and accordingly may have external and/or integrated cameras (not shown), motion detection mechanisms (not shown) and the like. Any and all such variations, and any combination thereof, are contemplated to be within the scope of embodiments of the present technology.

The first peer computing device 210 includes an available service determining component 218, a protocol determining component 220, an encoding component 222, a publishing component 224, and an activation component 226. The available service determining component 218 is configured to determine any services that the first peer computing device 210 is capable of sharing with proximal computing devices (e.g., the second peer computing device 212). As utilized herein, "proximal" devices are those devices that are "nearby" one another. By way of example, for infrastructure networks, or networks on which two peers are already connected to one another, proximal devices, in the most straight-forward case, are devices having a routable connection. In the more limited case, proximal peers are peers that are capable of sending and receiving multicast messages between one another. This is the most common case for current network protocols. For wireless networks, proximal peers are peers within each other's radio signal broadcast and receiving range.

As described above, available service determining component 218 is configured to determine any services associated with the first peer computing device 210. In one embodiment, one or more services of the first computing device may be determined by accessing a registry or listing of available services, such as a data record, which may be determined by scanning the first peer computing device 210, or by a user of the first peer computing device 210 manually registering or designating available services (which may be carried out by providing a prompt for querying the user, such as "which services would you like to make available to other devices?", or by the particular service registering itself with the first peer computing device), or by accessing a record of system information or devices information about the first peer computing device.

In some embodiments, available service determining component 218 (or other component of first peer computing device 210) determines or identifies the information corresponding to a service for accessing and understanding that service, which may be utilized in order to make the service available to another computing device. For example, available service determining component 218 may use a set of rules or logic, a specification, or an API associated with a service, to determine this information. This information may be associated with the particular service and provided to other components of first peer computing device 210. For example, protocol determining component 220 may utilize this information to determine one or more optimal protocols, given the particular service that is to be accessed.

For purposes of service publication and discovery, a peer computing device that does not have knowledge of the other peer computing devices that may be discovering its services may either always be listening for peer service discovery requests and/or actively broadcasting its own services. Another approach that may be utilized is for a user to physically activate some kind of pairing or discovery mode on the device, e.g., via pressing a service discovery button, or the like. Having to put a peer computing device into a pairing or discovery mode is error prone and not particularly user friendly. However, in instances where a peer computing device is constantly listening for peer computing device requests for services or actively publishing its available services, power-efficiency and impact on the peer computing device's normal operation should be considered. This issue is especially acute for peer computing devices running on a battery.

The protocol determining component 220 is configured to determine, in view of a plurality of different service discovery scenarios, the best (e.g., most power efficient or optimal) protocols to use for the various stages of each scenario. The protocol determining component 220 can determine a publication protocol and an activation protocol. The publication protocol is used to communicate service availability to other devices. The activation protocol is used to access the service.

To select the publication protocol, the first peer computing device can identify communication technologies and associated communication protocols available to the first peer computing device. The available communication protocols can vary from device to device based on technologies (e.g., various radios installed) and software available on a device. The present context of the device, for example, whether or not the device is currently communicating with a network to which other devices are attached can play a role in the selection decision.

The protocol determining component 220 may be able to identify available communication protocols from a protocol-availability file (or any other method of storing data, such as code within an application) in a data store associated with the computing device. In one aspect, the protocol availability file includes a market availability score for each available protocol and a power-usage classification. The availability score can be a measure of devices (e.g., a percentage of devices) that are capable of using the protocol. An entity providing services to the first peer computing device, such as a company providing an operating system or application, can periodically provide updated availability scores and other information to the protocol availability file. The availability file could be stored on a computing device or in remote storage, for example, in a data center accessible to the computing device.

In one aspect, the protocol determining component 220 of first peer computing device determines that other devices are proximate and not connected over a directly routable connection. The proximity of other devices can be determined by detecting a wireless signal originating from the other devices. In another aspect, a service provides a notification that other devices are in proximity. The service could determine the location of different devices and provide a notification that other devices are nearby. For instance, a device location may be determined based on a GPS sensor (or GPS-provided data) associated with each device, Wi-Fi positioning system (WPS) which may include a received signal strength indication (RSSI), fingerprinting, angle of arrival, time or flight, or other localization techniques, wireless-triangulation, geolocation of an IP address, or a combination of these. Each device may provide its location information (or the location may be interrogated from the device, for instance, by a monitoring program). The distance between the locations is then determined and compared to a proximity threshold distance used to classify devices as proximate to each other. In one aspect, the proximity threshold can be tied to being in range of a common wireless network.

In an aspect, if the wireless signal from the other device includes a discovery request, then the first peer computing device selects the communication protocol of the wireless signal on which the discovery request was sent for the publication protocol. A publication message with activation instructions for the service can then be communicated in the selected communication protocol.

If the wireless signal does not include a discovery request and is classified as low power in the availability file, then the first peer computing device selects the communication protocol of the detected wireless signal as the publication protocol. A publication message with activation instructions for the service can then be communicated in the selected communication protocol.

If the wireless signal does not include a discovery request and uses a communication that is classified as high power, then the first peer computing device selects a low power communication protocol from the available list with the highest availability score as the publication protocol. A publication message with activation instructions for the service can then be communicated in the selected communication protocol.

If no response is received to the publication message, then the high power protocol used in the wireless signal used by the other device can be selected. A publication message with activation instructions for the service can then be communicated in the selected high power communication protocol originally used by the wireless signal.

If, after a publication message is sent and no reply is received, then additional protocols can be selected, first from the low power group in order of decreasing availability (e.g., highest availability first) and then in the high power group in order of decreasing availability. In other words, the lowest power and most available communication protocols are selected first.

In exemplary embodiments, the best protocols are those that are the most power-efficient for publication and discovery and the most performant for connection and activation. In other exemplary embodiments, the best protocols are those that are the most latency sensitive for publication and discovery and the most power-efficient for connection and activation. Any and all such variations, and any combination thereof, are contemplated within the scope of embodiments of the present technology. A secondary objective may be to select a protocol that will interoperate well with other devices already in the ecosystem.

If connecting peer computing devices are on the same IP network, whether on the same subnet or different subnets, including infrastructure WiFi networks, the marginal power cost to publish and discover services is nearly zero. Thus, a number of IP-network based protocols are sufficient for publication and discovery including, without limitation, UPnP/DLNA, WSD, mDNS/DNS-SD, AllJoyn, Smartglass/Continuous Data Protection and (CDP). In exemplary embodiments hereof, the protocol determining component 220 selects DNS-SD for publication and discovery due to its superior interoperability and the ability to publish and discover past a local subnet. WINDOWS and iOS® have native support for mDNS/DNS-SD and it is fairly simple to implement on ANDROID or even embedded devices that support IP networks.

For publishing and discovering peer computing devices that are physically nearby, or not available over any common IP-networks, in exemplary embodiments hereof, the protocol determining component 220 selects BTLE for publication. For several years, almost all laptop computing devices and mobile computing devices have shipped with a BTLE radio. BTLE radios have the ability to do hardware offload such that the service publication advertisements are handled in the firmware of the radio. This effectively makes the marginal power cost of service publication advertisements zero because they don't use the CPU and the radio is designed to draw very little power in this scenario. Embedded devices can publish LE advertisements for years on a tiny coin cell, for example. In other exemplary embodiments, the protocol determining component 220 may select ZigBee for power reasons as well; however, its consumer market penetration is small compared to Bluetooth. For industrial IoT scenarios, the protocol determining component 220 may select ZigBee or similar wireless mesh network protocol, instead of BTLE.

WiFiDirect, on the other hand, is not very well supported in the ecosystem and, in its present form, has inferior power efficiency relative to Bluetooth to always be publishing. However, in exemplary embodiments, the protocol determining component 220 may select WFD for publication and discovery as an alternative implementation to Bluetooth. Aside from that, WFD is very useful for bootstrapping a proximal IP network. This is particularly handy if the service in question requires an IP network and there are not routes to the publishing computing device over any existing network. For example, a printer the second peer computing device 212 desires to utilize may allow connection to it using WFD but, after the network is bootstrapped, it may actually use WSD or IPP.

The encoding component 222 is configured to encode protocols identified by the protocol determining component 220 with instructions for understanding and accessing the services via the activation protocol. Embodiments hereof define an encoded Binary Large Object (BLOB) format that describes the services available in association with the publishing device, e.g., the first peer computing device 210. The service BLOB provides discovering peer computing devices, e.g., the second peer computing device 212, with the information needed to initiate connection with a desired service. By way of example, and not limitation, the service BLOB may include the identity of the service, the identity of the activation protocol, a friendly name associated with the service, and one or more details that support initiation of a connection over the activation protocol, e.g., a PIN number, access code, or the like. The computing device publishing the service BLOB provides a vector of 1-N BLOBS. Depending on the selected publication protocol, this payload may fit directly into the discovery packets. Some publication protocols, however, may require a discovering peer computing device (e.g., second peer computing device 212) to make extra connections to download the service BLOB.

Conceptually, each service BLOB will contain a list of services available on a publishing peer computing device over various protocols. Each published service record, in exemplary embodiments hereof, may contain the following information: {protocol_guid, service_class_id_guid, service_friendly_name, and connection parameters}. By way of example only, and not limitation, the first peer computing device 210 may support the following services: a WSD printer, an UPnP media server, and a BTLE virtual smart card. In this instance, and in accordance with embodiments hereof, the BLOB associated with the first peer computing device 210 may be encoded with the following services in the DNS service record:

```
{protocol_WSD_guid, WSD_printer_class_guid,
    L"Print Service,"
wsd_printer_URI}
    {protocol_UPnP_guid, UPnP_DMR_class_guid,
    L"John Doe's media library,"
UPnP_DMS_URI}
    {protocol_BTLE_guid, virtual_smart_card_class_guid,
    L"Virtual Smart Card,"
{BTLE MAC address, BTLE_profile_guid}}
```

Figure 6:
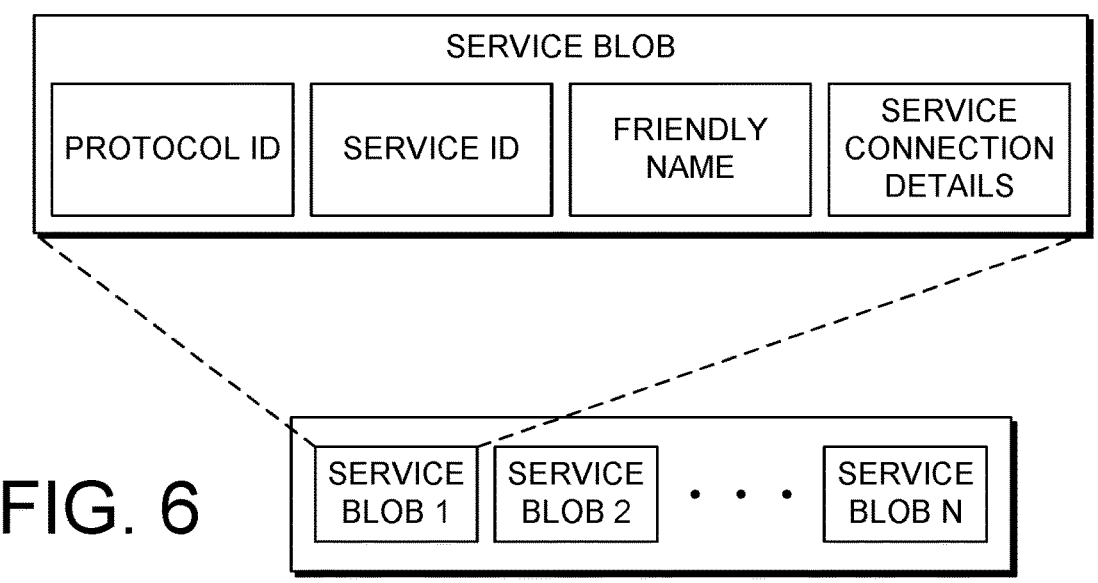
FIG. 6 is a schematic diagram showing exemplary instructions for accessing and understanding desired services, in accordance with an embodiment of the present technology.

A schematic diagram 600 illustrating a services payload of an exemplary peer computing device, the services payload having a plurality of service BLOBS, is illustrated in FIG. 6. In an alternative configuration (not shown), Bluetooth Generic Attribute Profile (GATT) or similar attribute protocol may be utilized instead of (or in addition to) service BLOBs. For instance, a GATT transaction may be performed between the first computing device acting as GATT client and the second peer computing device acting as the GATT server. Similarly, other embodiments may utilize a DNS Service Discovery (DNS-SD) or multicast DNS (mDNS) to discover and communicate information about the available services.

Encoding the available services with information as shown in the exemplary embodiments illustrated herein, permits the discovery by peer computing devices (e.g., second peer computing device 212) of services they would not otherwise have been able to discover. For instance, if the first and second peer computing devices 210, 212 were not on the same subnet, if discovery was implemented in accordance with prior art service discovery mechanisms, UPnP or WSD would not be discovered. Additionally, if the Bluetooth radio of the second peer computing device 212 was turned off or if the first peer computing device 210 was not engaging in Bluetooth discovery, the BTLE service would not be discovered. In accordance with embodiments hereof, all services are discoverable over a shared network.

The publishing component 224 is configured to publish the encoded services BLOB over the publication protocol selected for publication by the protocol determining component 220. In some embodiments, publishing component 224 may be considered to broadcast or communicate openly, via a communication component of the first peer computing device 210 such as a radio (not shown), the encoded services BLOB using the publication protocol. For instance, in one embodiment, information representing the encoded services BLOB may be modulated on a communication signal that is transmitted from the first peer computing device 210, and which may be received by a listening second peer computing device 212. In one embodiment, the first peer computing device 210 may receive an indication of the proximal presence of the second peer computing device 212 (for example, by detecting a beacon or broadcast emitted by the second peer computing device 212, by detecting that another device is sharing the same communication network, by detecting an IP address associated with the second peer computing device 212, or other means) and upon detecting the proximal presence, the first peer computing device 210 may broadcast or otherwise communicate the encoded services BLOB so that it may be received by the second peer computing device 212. In some embodiments, a communication session is established between the first peer computing device 210 and the second peer computing device 212 to exchange the encoded services BLOB. Accordingly, any and all such variations or combinations of these and known communication connection technologies are contemplated within the scope of embodiments of publishing component 224.

The activation component 226 is configured to, upon receipt of a request from a peer computing device (e.g., the second peer computing device 212), activate the requested service, which may comprise initializing, loading, or starting the service in some embodiments.

The second peer computing device 212 includes a discovery component 228, an instruction understanding and accessing component 230 and a connection component 232. The discovery component 228 is configured to initiate discovery over the publication protocol, that is, over the protocol that the first peer computing device 210 utilized for service publication. The discovery component 228 further is configured to download or receive the list of services associated with a service publication BLOB from the first peer computing device 210 and decode the list of services. For example, in one embodiment, a communication emitted by the first peer computing device 210 comprising the list of services (or an indication of the list of services) is received by the second peer computing device 212 via a communication receiver component, such as a radio (not shown). For instance, information corresponding to the encoded services BLOB may be received via a communication signal transmitted from the first peer computing device 210, demodulated (via the radio receiver), and decoded (if necessary) to determine the available services for the first peer computing device 210 and the information for accessing and understanding such services via their respective activation protocols, which may be provided to understanding and accessing component 230. As described previously, in some embodiments, a communication session may be briefly established between the first peer computing device 210 and the second peer computing device 212 to receive the list of services indicated in the encoded services BLOB. In some embodiments, discovery component 228 (or another component of the second peer computing device 212) may decode information in the services BLOB to determine the available services.

The available services may then be inspected and services in which the second peer computing device 212 is interested may be discovered. Additionally, the activation protocol associated with the desired service may be discovered. Once the discovery component 228 has located the service it is interested in, the connection details, along with the protocol and service identifiers, provide enough information on how to initiate connection with and activate that service utilizing the activation protocol. The instruction understanding and accessing component 230 is configured to access the instructions or connection details associated with desired services from the service publication BLOB and to understand such instructions or connection details.

The connection component 232 is configured to initiate connection with desired services utilizing the activation protocol encoded in the service publication BLOB. The service activation will then be completed by the activation component of the first peer computing device 210, as described herein above.

Figure 3:
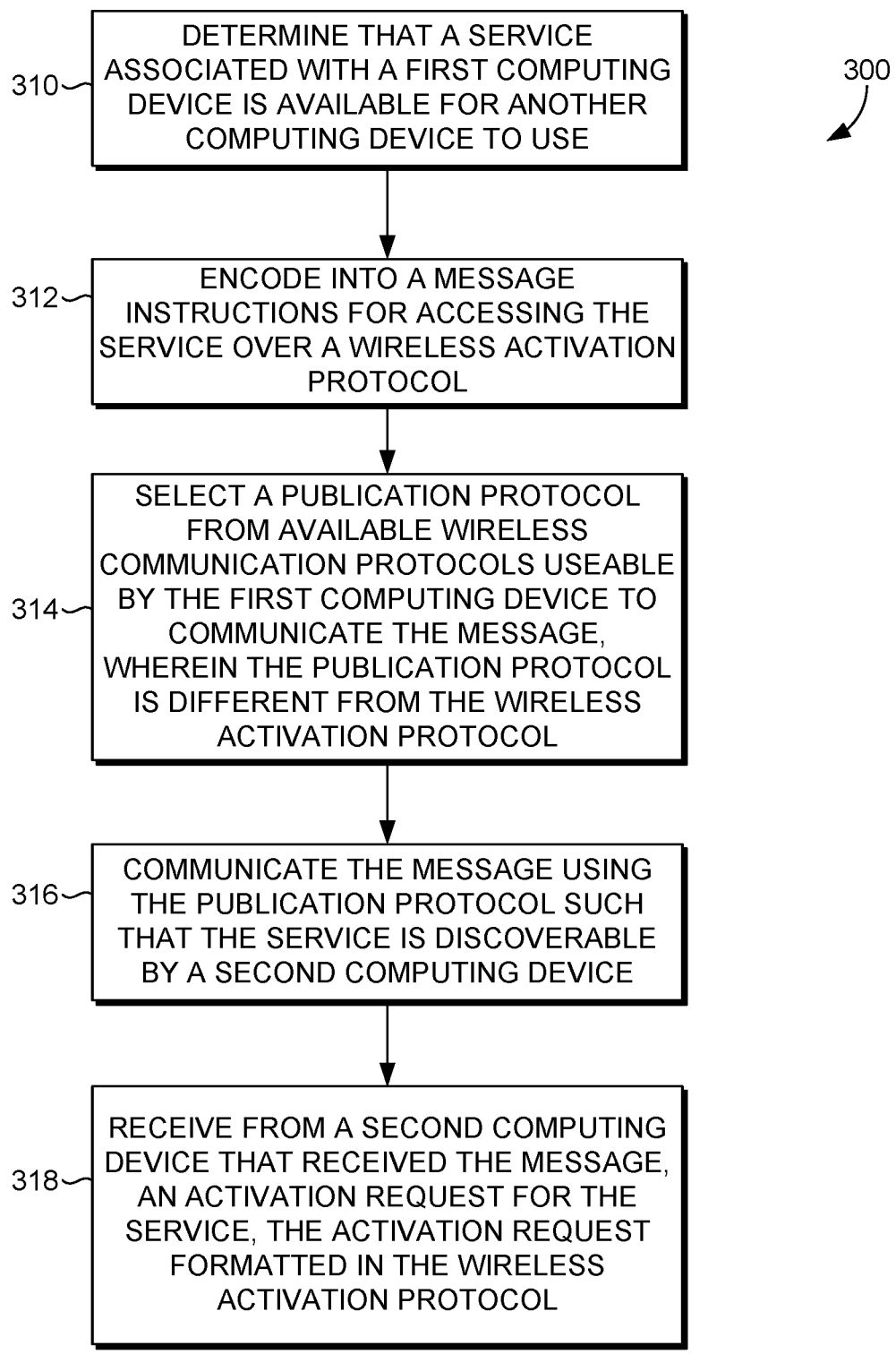
FIG. 3 is a flow diagram showing an exemplary method for publishing service availability in a plurality of service discovery scenarios, in accordance with an embodiment of the present technology.

Turning now to FIG. 3, a flow diagram is illustrated showing an exemplary method 300 for publishing service availability in a plurality of service discovery scenarios, in accordance with an embodiment of the present technology. As indicated at block 310, at least one available service associated with a first device (e.g., the first peer computing device 210 of FIG. 2) is determined (e.g., utilizing the available service determining component 218 of the first peer computing device 210 of FIG. 2) to be available for sharing with a second computing device. As described previously, the term "service" may include any capability or resource associated with a first peer computing device that may be accessed or utilized by a second peer computing device. For example, services may include a microphone, camera, speaker, printer, media server, a display component (such as a projector, monitor, or virtual reality headset), a user interface (such as a touch screen or touch pad, mouse, keyboard, Smart Board, Internet or network connection or network connection component (such as a BLTE smart card), computer-processing or computation capabilities (which may be used for providing faster rendering or more efficient computation than what is possible on the second peer computing device), storage, I/O ports, specific applications (or apps) and computer-performed services (which may include a virtual assistant program or a cloud-based service, for instance), or specific equipment (such as a HoloLens or Smart Hub, both manufactured by Microsoft of Redmond, Wash., a smart appliance, or smart-home controller). A particular service may have corresponding information about accessing and understanding that service, which may be utilized in order to make the service available to another computing device.

The service is associated with an activation protocol (determined, for instance, by the protocol determining component 220 of the first peer computing device 210 of FIG. 2). The activation protocol can be a wireless communication protocol suitable for accessing the service. Different services may require different amounts and types of information to be exchanged in order for the service to be accessed. In one aspect, each service is associated in computer memory with one or more suitable communication protocols.

As indicated at block 312, the instructions for accessing the service are encoded (e.g., utilizing the encoding component 222 of the first peer computing device 210 of FIG. 2) into a message. The instructions allow a recipient device to negotiate a communication session with the first computing device. The instructions can specify that the activation protocol, which can be a known wireless communication protocol, be used to access the service. In embodiments, such encoding may be formatted into a service publication BLOB, as discussed herein above.

As indicated at block 314, a publication protocol is selected from available wireless communication protocols usable by the first computing device (e.g., utilizing the protocol determining component 220). The publication protocol can be different from the activation protocol. The selection can be based on the wireless context of the computing device making the selection. The wireless context can include the capabilities of first computing device and detected wireless signals.

To select the publication protocol, the first peer computing device can identify communication technologies and associated communication protocols available to the first peer computing device. The available communication protocols can vary from device to device based on technologies (e.g., various radios installed) and software available on a device. The present context of the device, for example, whether or not the device is currently communicating with a network to which other devices are attached can play a role in the selection decision.

The first computing device can identify available communication protocols from a protocol-availability file in a data store associated with the computing device. "File" can be used broadly herein to mean any type of data storage, including a section of code in an application. In one aspect, the protocol availability file includes a market availability score for each available protocol and a power-usage classification. The availability score can be a measure of devices (e.g., a percentage of devices) that are capable of using the protocol. An entity providing services to the first peer computing device, such as a company providing an operating system or application, can periodically provide updated availability scores and other information to the protocol availability file. The availability file could be stored on a computing device or in remote storage, for example, in a data center accessible to the computing device.

In one aspect, other devices are determined to be proximate and not connected over a directly routable connection. The proximity of other devices can be determined by detecting a wireless signal originating from the other devices. In another aspect, a service provides a notification that other devices are in proximity. The service could determine the location of different devices and provide a notification that other devices are nearby. For instance, a device location may be determined based on a GPS sensor (or GPS-provided data) associated with each device, Wi-Fi positioning system (WPS) which may include a received signal strength indication (RSSI), fingerprinting, angle of arrival, time or flight, or other localization techniques, wireless-triangulation, geolocation of an IP address, or a combination of these. Each device may provide its location information (or the location may be interrogated from the device, for instance, by a monitoring program). The distance between the locations is then determined and compared to a proximity threshold distance used to classify devices as proximate to each other. In one aspect, the proximity threshold can be tied to being in range of a common wireless network.

In an aspect, if the wireless signal from the other device includes a discovery request, then the first peer computing device selects the communication protocol of the wireless signal on which the discovery request was sent for the publication protocol. A publication message with activation instructions for the service can then be communicated in the selected communication protocol.

If the wireless signal does not include a discovery request and is classified as low power in the availability file, then the first peer computing device selects the communication protocol of the detected wireless signal as the publication protocol. A publication message with activation instructions for the service can then be communicated in the selected communication protocol.

If the wireless signal does not include a discovery request and uses a communication that is classified as high power, then the first peer computing device selects a low power communication protocol from the available list with the highest availability score as the publication protocol. A publication message with activation instructions for the service can then be communicated in the selected communication protocol.

If no response is received to the publication message, then the high power protocol used in the wireless signal used by the other device can be selected. A publication message with activation instructions for the service can then be communicated in the selected high power communication protocol originally used by the wireless signal.

If, after a publication message is sent and no reply is received, then additional protocols can be selected, first from the low power group in order of decreasing availability (e.g., highest availability first) and then in the high power group in order of decreasing availability. In other words, the lowest power and most available communication protocols are selected first.

In exemplary embodiments, the best protocols are those that are the most power-efficient for publication and discovery and the most performant for connection and activation. In other exemplary embodiments, the best protocols are those that are the most latency sensitive for publication and discovery and the most power-efficient for connection and activation. Any and all such variations, and any combination thereof, are contemplated within the scope of embodiments of the present technology. A secondary objective may be to select a protocol that will interoperate well with other devices already in the ecosystem.

As indicated at block 316, the message is published (e.g., utilizing the publishing component 224 of the first peer computing device 210 of FIG. 2) via the selected publication protocol (also determined by, for instance, the protocol determining component 220 of the first peer computing device 210 of FIG. 2) such that the encoded service is discoverable by at least a second device (e.g., the second peer computing device 212) of FIG. 2). The publication can occur by transmitting the message through a computing device's radio that is suitable for use with the publication protocol.

As indicated at block 318, an activation request for the available at least one service is received via the activation protocol (e.g., by the activation component 226 of the first peer computing device 210 of FIG. 2) and, as indicated at block 318, the at least one service is activated.

Figure 4:
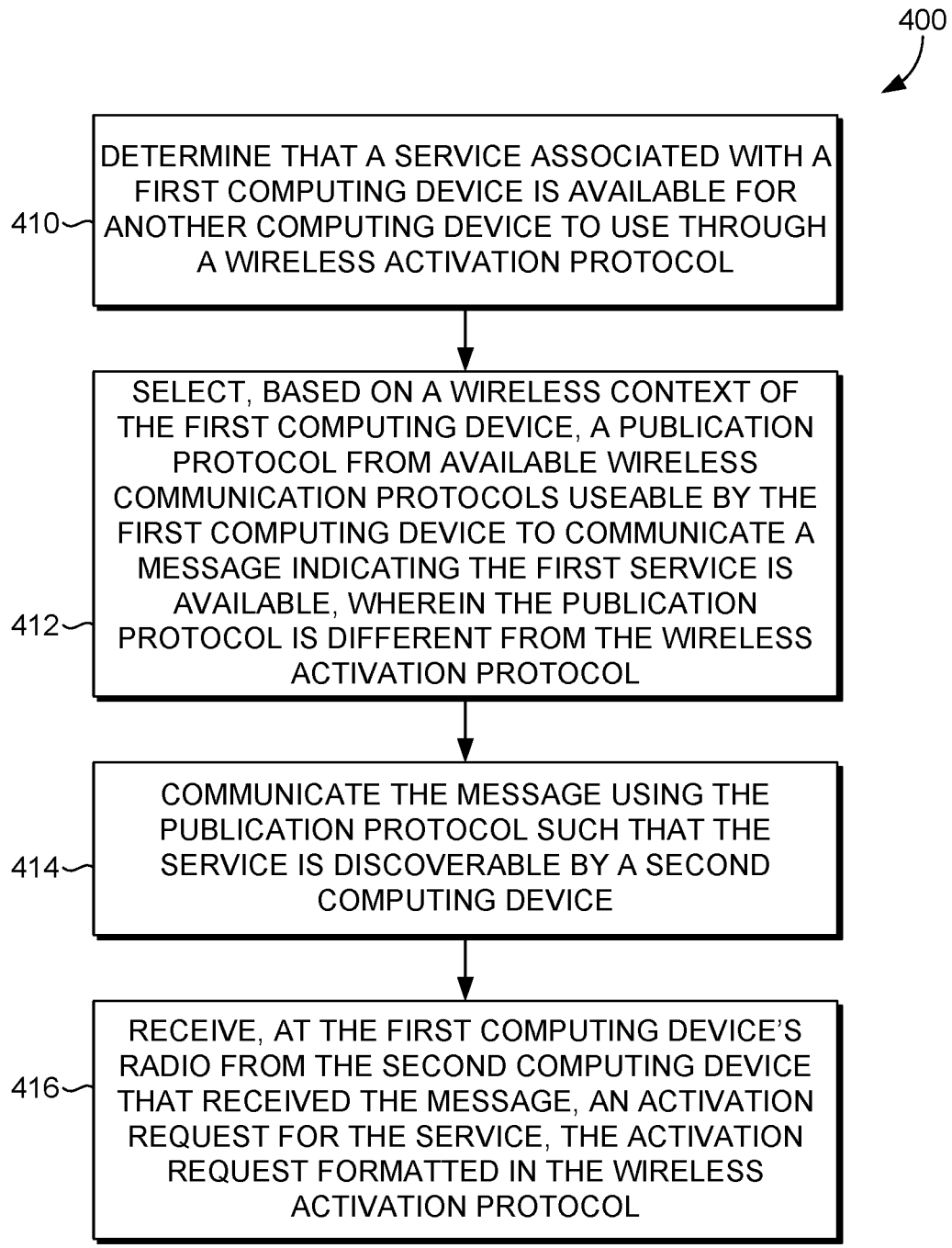
FIG. 4 is a flow diagram showing an exemplary method for publishing service availability and activating requested services in a plurality of service discovery scenarios, in accordance with an embodiment of the present technology.

With reference to FIG. 4, a flow diagram is illustrated showing another exemplary method 400 for publishing service availability and activating requested services in a plurality of service discovery scenarios, in accordance with an embodiment of the present technology. As indicated at block 410, at least one available service associated with a first device (e.g., the first peer computing device 210 of FIG. 2) is determined (e.g., utilizing the available service determining component 218 of the first peer computing device 210 of FIG. 2) to be available for another computing device to use. As described previously, the term "service" may include any capability or resource associated with a first peer computing device that may be accessed or utilized by a second peer computing device. For example, services may include a microphone, camera, speaker, printer, media server, a display component (such as a projector, monitor, or virtual reality headset), a user interface (such as a touch screen or touch pad, mouse, keyboard, Smart Board, Internet or network connection or network connection component (such as a BLTE smart card), computer-processing or computation capabilities (which may be used for providing faster rendering or more efficient computation than what is possible on the second peer computing device), storage, I/O ports, specific applications (or apps) and computer-performed services (which may include a virtual assistant program or a cloud-based service, for instance), or specific equipment (such as a HoloLens or Smart Hub, both manufactured by Microsoft of Redmond, Wash., a smart appliance, or smart-home controller). A particular service may have corresponding information about accessing and understanding that service, which may be utilized in order to make the service available to another computing device.

The service is associated with an activation protocol (determined, for instance, by the protocol determining component 220 of the first peer computing device 210 of FIG. 2). The activation protocol can be a wireless communication protocol suitable for accessing the service. Different services may require different amounts and types of information to be exchanged in order for the service to be accessed. In one aspect, each service is associated in computer memory with one or more suitable communication protocols.

As indicated at block 412, a publication protocol is selected from available wireless communication protocols usable by the first computing device (e.g., utilizing the protocol determining component 220). The publication protocol can be different from the activation protocol. The selection can be based on the wireless context of the computing device making the selection. The wireless context can include the capabilities of first computing device and detected wireless signals.

To select the publication protocol, the first peer computing device can identify communication technologies and associated communication protocols available to the first peer computing device. The available communication protocols can vary from device to device based on technologies (e.g., various radios installed) and software available on a device. The present context of the device, for example, whether or not the device is currently communicating with a network to which other devices are attached can play a role in the selection decision.

The first computing device can identify available communication protocols from a protocol-availability file in a data store associated with the computing device. "File" can be used broadly herein to mean any type of data storage, including a section of code in an application. In one aspect, the protocol availability file includes a market availability score for each available protocol and a power-usage classification. The availability score can be a measure of devices (e.g., a percentage of devices) that are capable of using the protocol. An entity providing services to the first peer computing device, such as a company providing an operating system or application, can periodically provide updated availability scores and other information to the protocol availability file. The availability file could be stored on a computing device or in remote storage, for example, in a data center accessible to the computing device.

In one aspect, other devices are determined to be proximate and not connected over a directly routable connection. The proximity of other devices can be determined by detecting a wireless signal originating from the other devices. In another aspect, a service provides a notification that other devices are in proximity. The service could determine the location of different devices and provide a notification that other devices are nearby. For instance, a device location may be determined based on a GPS sensor (or GPS-provided data) associated with each device, Wi-Fi positioning system (WPS) which may include a received signal strength indication (RSSI), fingerprinting, angle of arrival, time or flight, or other localization techniques, wireless-triangulation, geolocation of an IP address, or a combination of these. Each device may provide its location information (or the location may be interrogated from the device, for instance, by a monitoring program). The distance between the locations is then determined and compared to a proximity threshold distance used to classify devices as proximate to each other. In one aspect, the proximity threshold can be tied to being in range of a common wireless network.

In an aspect, if the wireless signal from the other device includes a discovery request, then the first peer computing device selects the communication protocol of the wireless signal on which the discovery request was sent for the publication protocol. A publication message with activation instructions for the service can then be communicated in the selected communication protocol.

If the wireless signal does not include a discovery request and is classified as low power in the availability file, then the first peer computing device selects the communication protocol of the detected wireless signal as the publication protocol. A publication message with activation instructions for the service can then be communicated in the selected communication protocol.

If the wireless signal does not include a discovery request and uses a communication that is classified as high power, then the first peer computing device selects a low power communication protocol from the available list with the highest availability score as the publication protocol. A publication message with activation instructions for the service can then be communicated in the selected communication protocol.

If no response is received to the publication message, then the high power protocol used in the wireless signal used by the other device can be selected. A publication message with activation instructions for the service can then be communicated in the selected high power communication protocol originally used by the wireless signal.

If, after a publication message is sent and no reply is received, then additional protocols can be selected, first from the low power group in order of decreasing availability (e.g., highest availability first) and then in the high power group in order of decreasing availability. In other words, the lowest power and most available communication protocols are selected first.

In exemplary embodiments, the best protocols are those that are the most power-efficient for publication and discovery and the most performant for connection and activation. In other exemplary embodiments, the best protocols are those that are the most latency sensitive for publication and discovery and the most power-efficient for connection and activation. Any and all such variations, and any combination thereof, are contemplated within the scope of embodiments of the present technology. A secondary objective may be to select a protocol that will interoperate well with other devices already in the ecosystem.

As indicated at block 414, the message is published (e.g., utilizing the publishing component 224 of the first peer computing device 210 of FIG. 2) via a publication protocol (also determined by, for instance, the protocol determining component 220 of the first peer computing device 210 of FIG. 2) such that the service is discoverable by at least a second device (e.g., the second peer computing device 212) of FIG. 2). The publication can occur by transmitting the message through a computing device's radio that is suitable for use with the publication protocol.

As indicated at block 416, a request to activate the at least one available service is received (e.g., from the connection component 232 of the second peer computing device 212 of FIG. 2) via the activation protocol. As indicated at block 418, the requested service is activated (e.g., utilizing the activation component 226 of the first peer computing device 210 of FIG. 2).

Figure 5:
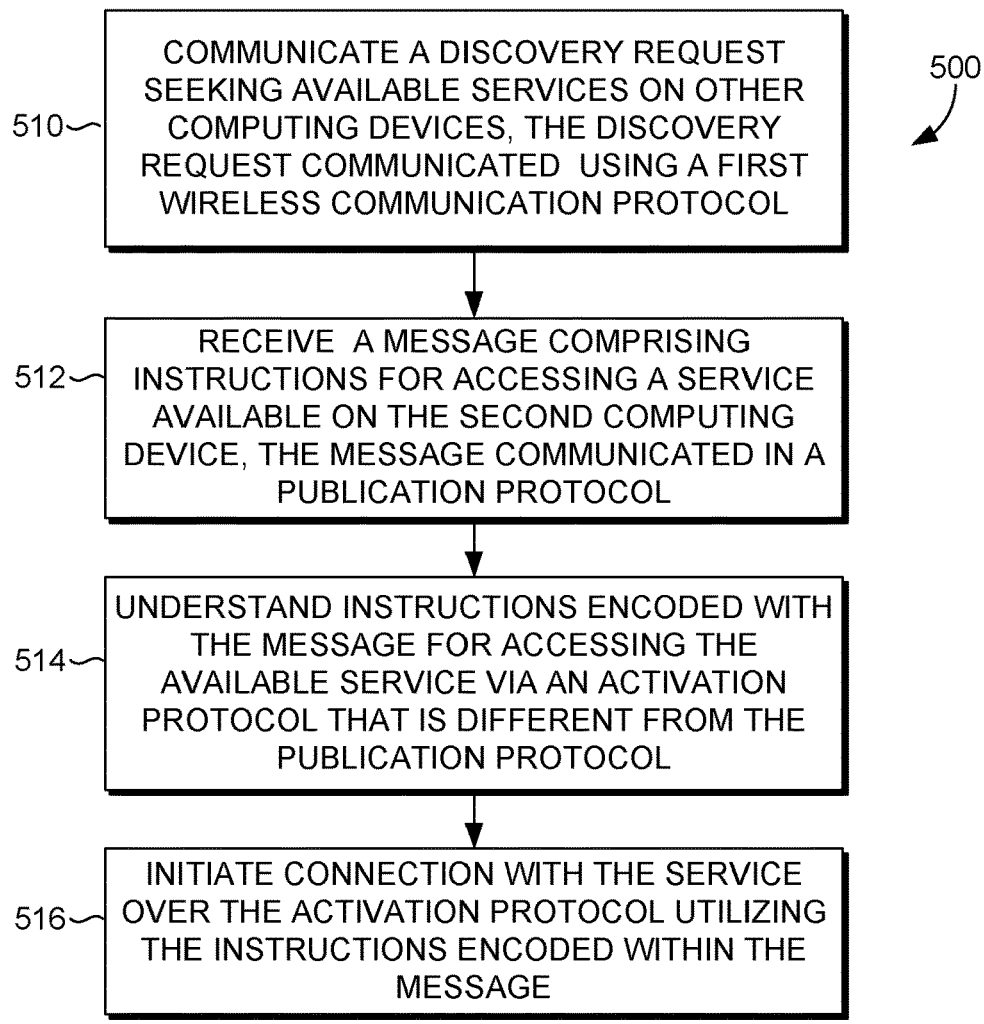
FIG. 5 is a flow diagram showing an exemplary method for service discovery and connection initiation in a plurality of service discovery scenarios, in accordance with an embodiment of the present technology.

Turning now to FIG. 5, a flow diagram is illustrated showing an exemplary method 500 for service discovery and connection initiation in a plurality of service discovery scenarios, in accordance with an embodiment of the present technology. As indicated at block 510, at least one available service associated with a first device (e.g., the first peer computing device 210 of FIG. 2) is discovered, for instance, utilizing the discovery component 228 of the second peer computing device 212 of FIG. 2. The discovery can occur by receiving a message comprising instructions for accessing the service. The message can be formatted in a wireless publication protocol. The discovery can occur even when a discovery request is not communicated. As indicated at block 512, instructions encoded with the message (e.g., in a service publication BLOB, as discussed herein above) are accessed and understood, for instance, utilizing the instruction understanding and accessing component 230 of the second peer computing device 212 of FIG. 2). The instructions are for activating the at least one available service via the activation protocol.

As described previously, the term "service" may include any capability or resource associated with a first peer computing device that may be accessed or utilized by a second peer computing device. For example, services may include a microphone, camera, speaker, printer, media server, a display component (such as a projector, monitor, or virtual reality headset), a user interface (such as a touch screen or touch pad, mouse, keyboard, Smart Board, Internet or network connection or network connection component (such as a BLTE smart card), computer-processing or computation capabilities (which may be used for providing faster rendering or more efficient computation than what is possible on the second peer computing device), storage, I/O ports, specific applications (or apps) and computer-performed services (which may include a virtual assistant program or a cloud-based service, for instance), or specific equipment (such as a HoloLens or Smart Hub, both manufactured by Microsoft of Redmond, Wash., a smart appliance, or smart-home controller). A particular service may have corresponding information about accessing and understanding that service, which may be utilized in order to make the service available to another computing device.

The service is associated with an activation protocol (determined, for instance, by the protocol determining component 220 of the first peer computing device 210 of FIG. 2). The activation protocol can be a wireless communication protocol suitable for accessing the service. Different services may require different amounts and types of information to be exchanged in order for the service to be accessed. In one aspect, each service is associated in computer memory with one or more suitable communication protocols.

As indicated at block 514, connection with the available service is initiated over the activation protocol utilizing the instructions encoded with the message. This may be accomplished, for instance, utilizing the connection component 232 of the second peer computing device 212 of FIG. 2.

As can be understood, embodiments of the present technology provide systems, methods, and computer-readable storage media for, among other things, publishing, discovering, connecting with and activating services in a peer-to-peer environment. Services available in association with a first computing device are determined and encoded with instructions for accessing and understanding such services via their respective activation protocols. The encoded services are published via a publication protocol such that they are discoverable by at least a second computing device, irrespective of whether such services may be activated via the publication protocol. The second computing device discovers the available services via the publication protocol and accesses and understands the instructions associated with a desired service. Upon receipt of a request from the second computing device, via the activation protocol, to activate the requested service, the requested service is activated by the first computing device.

EMBODIMENTS

Embodiment 1

A method for controlling service discovery and activation in a plurality of comprising: determining that a service associated with a first computing device is available for another computing device to use; encoding, into a message, instructions for accessing the service over a wireless activation protocol; selecting, based on a wireless context of the first computing device, a publication protocol from available wireless communication protocols useable by the first computing device to communicate the message, wherein the publication protocol is different from the wireless activation protocol; communicating, from the first computing device's radio, the message using the publication protocol such that the service is discoverable by a second computing device; receiving, at the first computing device's radio from the second computing device that received the message, an activation request for the service, the activation request formatted in the wireless activation protocol; and activating the service for use by the second computing device, wherein the service is accessed through wireless communications formatted according to the wireless activation protocol.

Embodiment 2

The method of embodiment 1, wherein said selecting is based on power consumption associated with each of the wireless communication protocols useable by the first computing device.

Embodiment 3

The method of one of embodiment 1 or 2, wherein the message comprises an identity of the wireless activation protocol and one or more details that support connection to the first computing device over the wireless activation protocol.

Embodiment 4

The method of one of embodiment 1, 2 or 3, wherein the wireless context comprises wireless communications originating from other computing devices and wireless communication protocols of the wireless communications.

Embodiment 5

The method of one of embodiment 1, 2, 3 or 4, wherein the publication protocol is a protocol having superior power efficiency relative to other of the wireless communication protocols useable by the first computing device.

Embodiment 6

The method of one of embodiment 1, 2, 3, 4 or 5, wherein the wireless activation protocol has superior performance when accessing the service relative to other of the wireless communication protocols useable by the first computing device.

Embodiment 7

The method of one of embodiment 1, 2, 3, 4, 5 or 6, wherein the publication protocol and the wireless activation protocol are industry standard protocols.

Embodiment 8

The method of one of embodiment 1, 2, 3, 4, 5 or 6, wherein the method further comprises detecting that the second computing device is proximate to the first computing device by detecting a wireless signal transmitted by the second computing device in a third wireless communication protocol that is different from the publication protocol and the wireless activation protocol.

Embodiment 9

A system for publishing service availability in a plurality of service discovery scenarios, the system comprising: a processor; and a computer storage media having computer executable instructions embodied thereon that when executed by the processor configure the system to: determine that a service associated with a first computing device is available for another computing device to use through a wireless activation protocol; select, based on a wireless context of the first computing device, a publication protocol from available wireless communication protocols useable by the first computing device to communicate a message indicating the service is available, wherein the publication protocol is different from the wireless activation protocol; communicate the message using the publication protocol such that the service is discoverable by a second computing device; and receive, at the first computing device's radio from the second computing device that received the message, an activation request for the service, the activation request formatted in the wireless activation protocol.

Embodiment 10

The system of one of embodiment 9, wherein the wireless context comprises on one or more of capabilities associated with the first computing device and activities presently engaged in by the first computing device.

Embodiment 11

The system of one of embodiment 9 or 10, wherein the wireless activation protocol is different from the publication protocol.

Embodiment 12

The system of embodiment 11, wherein the publication protocol is a protocol having superior power efficiency relative to other available wireless communication protocols.

Embodiment 13

The system of embodiment 11, wherein the wireless activation protocol is a protocol having superior performance relative to the publication protocol.

Embodiment 14

The system of one of any of the above embodiments, wherein the wireless context comprises market availability of the publication protocol compared to other available wireless communication protocols.

Embodiment 15

A method for service discovery and activation comprising:
receiving, from a second computing device, a message comprising instructions for accessing a service available on the second computing device, the message communicated in a publication protocol; understanding instructions encoded with the message for accessing the service via an activation protocol that is different from the publication protocol; and initiating connection with the service over the activation protocol utilizing the instructions encoded within the message.

Embodiment 16

The method of embodiment 15, wherein the publication protocol is different from the activation protocol.

Embodiment 17

The method of one of embodiment 15 or 16, wherein the instructions encoded with the message comprise an identity of the activation protocol and one or more details that support connection with the service over the activation protocol.

Embodiment 18

The method of one of embodiment 15, 16 or 17, wherein the first wireless communication protocol and the publication protocol are different and the publication protocol is a protocol having superior power efficiency relative to the first wireless communication protocol.

Embodiment 19

The method of one of embodiment 15, 16, 17, or 18, wherein the activation protocol is a protocol having superior performance relative to the publication protocol.

Embodiment 20

The method of embodiment 19, wherein the method further comprises communicating a discovery request seeking available services on other computing devices, the discovery request communicated from a first computing device using a first wireless communication protocol.

The present technology has been described in relation to particular embodiments, which are intended in all respects to be illustrative rather than restrictive. Alternative embodiments will become apparent to those of ordinary skill in the art to which the present invention pertains without departing from its scope.

While the technology is susceptible to various modifications and alternative constructions, certain illustrated embodiments thereof are shown in the drawings and have been described above in detail. It should be understood, however, that there is no intention to limit the technology to the specific forms disclosed, but on the contrary, the intention is to cover all modifications, alternative constructions, and equivalents falling within the spirit and scope of the technology.

What is claimed is:

1. A method for controlling service discovery and activation in a plurality of service discovery scenarios comprising:
   determining that a service associated with a first computing device is available for another computing device to use by receiving a registration from the service that communicates the service is available for the another computing device;
   encoding, into a message, instructions for accessing the service over a wireless activation protocol
   selecting, based on a wireless context of the first computing device, a publication protocol from available wireless communication protocols useable by the first computing device to communicate the message, wherein the publication protocol is different from the wireless activation protocol;
   communicating, from the first computing device's radio, the message using the publication protocol such that the service is discoverable by a second computing device;
   receiving, at the first computing device's radio from the second computing device that received the message, an activation request for the service, the activation request formatted in the wireless activation protocol; and
   activating the service for use by the second computing device, wherein the service is accessed through wireless communications formatted according to the wireless activation protocol.

2. The method of claim 1, wherein said selecting is based on power consumption associated with each of the wireless communication protocols useable by the first computing device.

3. The method of claim 1, wherein the message comprises an identity of the wireless activation protocol and one or more details that support connection to the first computing device over the wireless activation protocol.

4. The method of claim 1, wherein the wireless context comprises wireless communications originating from other computing devices and wireless communication protocols of the wireless communications.

5. The method of claim 1, wherein the publication protocol is a protocol having superior power efficiency relative to other of the wireless communication protocols useable by the first computing device.

6. The method of claim 1, wherein the wireless activation protocol has superior performance when accessing the service relative to other of the wireless communication protocols useable by the first computing device.

7. The method of claim 1, wherein the publication protocol and the wireless activation protocol are industry standard protocols.

8. The method of claim 1, wherein the method further comprises detecting that the second computing device is proximate to the first computing device by detecting a wireless signal transmitted by the second computing device in a third wireless communication protocol that is different from the publication protocol and the wireless activation protocol.

9. A system for publishing service availability in a plurality of service discovery scenarios, the system comprising:
   a processor; and
   a computer storage media having computer executable instructions embodied thereon that when executed by the processor configure the system to:
   determine that a service associated with a first computing device is available for another computing device to use through a wireless activation protocol by receiving a registration from the service that communicates the service is available for the another computing device;
   select, based on a wireless context of the first computing device, a publication protocol from available wireless communication protocols useable by the first computing device to communicate a message indicating the service is available, wherein the publication protocol is different from the wireless activation protocol, the message including an identity of the service, an identity of the wireless activation protocol, a friendly name associated with the service, and an access code to the wireless activation protocol;

communicate the message using the publication protocol such that the service is discoverable by a second computing device; and receive, at the first computing device's radio from the second computing device that received the message, an activation request for the service, the activation request formatted in the wireless activation protocol.

10. The system of claim 9, wherein the wireless context comprises on one or more of capabilities associated with the first computing device and activities presently engaged in by the first computing device.

11. The system of claim 9, wherein the wireless activation protocol is different from the publication protocol.

12. The system of claim 11, wherein the publication protocol is a protocol having superior power efficiency relative to other available wireless communication protocols.

13. The system of claim 11, wherein the wireless activation protocol is a protocol having superior performance relative to the publication protocol.

14. The system of claim 10, wherein the wireless context comprises market availability of the publication protocol compared to other available wireless communication protocols.

15. A method for service discovery and activation comprising:

receiving, from a second computing device, a message comprising instructions for accessing a service available on the second computing device, the message communicated in a publication protocol, wherein the service is determined to be available by receiving a registration from the service;

understanding instructions encoded with the message for accessing the service via an activation protocol that is different from the publication protocol, the instructions including an identity of the service, an identity of the activation protocol, a friendly name associated with the service, and an access code to the activation protocol; and initiating connection with the service over the activation protocol utilizing the instructions encoded within the message.

16. The method of claim 15, wherein the publication protocol is different from the activation protocol.

17. The method of claim 15, wherein the instructions encoded with the message comprise an identity of the activation protocol and one or more details that support connection with the service over the activation protocol.

18. The method of claim 15, wherein the activation protocol is a protocol having superior performance relative to the publication protocol.

19. The method of claim 15, wherein the method further comprises communicating a discovery request seeking available services on other computing devices, the discovery request communicated from a first computing device using a first wireless communication protocol.

20. The method of claim 19, wherein the first wireless communication protocol and the publication protocol are different and the publication protocol is a protocol having superior power efficiency relative to the first wireless communication protocol.

* * * * *